United States Patent [19]

Kish et al.

[11] Patent Number: 5,411,116
[45] Date of Patent: May 2, 1995

[54] SELF-SCAVENGING, HYBRID LUBRICATION SUBSYSTEM

[75] Inventors: Jules G. Kish, Milford; Stephen R. Sammataro, Norwalk; Charles J. Isabelle, Winsted, all of Conn.

[73] Assignee: United Technologies Corporation, Hartford, Conn.

[21] Appl. No.: 263,584

[22] Filed: Jun. 22, 1994

[51] Int. Cl.$^6$ ............................ F01M 3/00; F01M 9/00
[52] U.S. Cl. ..................................... 184/6.12; 184/6.2; 184/6.13; 184/11.2; 74/467; 475/159
[58] Field of Search ............. 184/6.12, 6.2, 6.13, 184/11.2, 11.1; 74/467; 475/159

[56] References Cited

U.S. PATENT DOCUMENTS 2,492,020 12/1949 Thoresen ........................ 184/6.2
4,612,818 9/1986 Hori et al. ...................... 184/6.12

FOREIGN PATENT DOCUMENTS 0541159 7/1922 France ........................... 184/11.2
3929743 4/1990 Germany ......................... 475/159
2089751 6/1982 United Kingdom ............... 184/6.2

*Primary Examiner*—Thomas E. Denion
*Attorney, Agent, or Firm*—Terrance J. Radke

[57] ABSTRACT

A self-scavenging, hybrid lubrication subsystem for a main transmission gearbox includes a sump fabricated as an integral extension of the lower portion of the gearbox wherein the sump dynamic fluid level is above the gearbox bottom. The interior sidewall of the lower gearbox is modified to include a cylindrical segment having a first radius, a throat segment having a second radius, and a transition segment contiguous with the cylindrical and throat segments. The radial discontinuity between the cylindrical and throat segments defines a nozzle inlet that directs the outflow of lubricating medium in the gearbox bottom to the sump via a nozzle. The outflow end of the nozzle is positioned above the sump dynamic fluid level. Housed within the lower gearbox is a planetary gear train that includes an annular planetary carrier plate having a deflection plate mounted thereto. The periphery of the carrier plate and the cylindrical and throat segments in combination form primary and restricted flow channels. Interaction between the deflection plate and the gearbox bottom exerts a viscous pumping action on the lubricating medium in the gearbox bottom causing it to flow outwardly into the primary and restricted flow channels. Interaction between the periphery of the rotating carrier plate and the structurally-modified sidewall exerts a viscous pumping action on the lubricating medium in the flow channels causing it to flow therethrough. Substantially all of the lubricating medium flowing through the primary flow channel is diverted through the nozzle to the sump.

16 Claims, 5 Drawing Sheets

SELF-SCAVENGING, HYBRID LUBRICATION SUBSYSTEM

RELATED APPLICATION

The instant application is related to commonly-owned, co-pending U.S. patent application entitled A STACKED COMPOUND PLANETARY GEAR TRAIN FOR AN UPGRADED POWERTRAIN SYSTEM FOR A HELICOPTER (S-4888) filed 26 May 1994.

1. Technical Field

The present invention is directed to lubrication subsystems, and more particularly, to a self-scavenging, hybrid lubrication subsystem for a powertrain system that has a configuration that provides a viscous pumping action for transporting the lubricating medium from the bottom of the main transmission gearbox to the sump.

2. Background of the Invention

A lubrication subsystem is a critical functional subsystem associated with a powertrain system. The interacting gears and mounting bearings of the powertrain system require lubrication for effective and efficient operation. The lubrication subsystem is operative to provide a lubricating medium to reduce the friction between interacting components of the powertrain system, to effectuate the transfer of thermal energy away from interacting components, and to function as the medium for transporting generated metallic debris away from interacting components. Exemplary lubrication subsystems for helicopter transmissions are schematically illustrated in FIGS. 1A, 1B.

FIG. 1A is a schematic representation of a "wet sump" lubrication subsystem 110 of the type used in BLACK HAWK ® helicopters (BLACK HAWK is a registered trademark of the Sikorsky Aircraft Division of United Technologies Corporation). The lubrication subsystem 110 is operative to provide a lubricating medium to left and right input and accessory modules 102, 103 (only one input module 102 and one accessory module 103 is illustrated) and the main transmission gearbox 104 of the powertrain system of the BLACK HAWK ® helicopter. The input modules 102, which function to transfer the output torque of the powerplant system to the main transmission gearbox 104, include engine input shafts, input reduction gearing, freewheel units, output shafts, and associated mounting bearings/gimbals. The main transmission gearbox 104 includes an upper portion 104U that houses the second stage reduction gearing and associated mounting bearings and a lower portion 104L that houses a planetary gear train that functions as the third stage reduction gearing and which is operative to couple torque to the helicopter main rotor shaft.

The wet sump lubrication subsystem 110 comprises a sump 112 disposed in combination with the bottom of the lower portion 104L of the main transmission gearbox 104, a plurality of secondary oil drain passages 114 between the upper and lower portions 104U, 104L of the gearbox 104, and a plurality of primary oil drain passages 116 between the lower portion 104L of the gearbox 104 and the sump 112.

The wet sump lubrication subsystem 110 further includes right and left lubrication pumps 118, each pump 118 having a scavenge stage 118A and a pump stage 118B (only the stages 118A, 118B of single lubrication pump 118 are illustrated), fluid piping 120 fluidically interconnecting each input and accessory module 102, 103 to the sump 112, fluid piping 122 fluidically interconnecting the sump 112 to a cooler 124 (operative to remove thermal energy from the lubricating medium), fluid piping 126 fluidically interconnecting the cooler 124 to a manifold 128, and fluid piping 130, 132 fluidically interconnecting the manifold 128 to the upper portion 104U of the main transmission gearbox 104 and the right and left input modules 102. Fluid jets (not shown) are fluidically interconnected with the fluid piping 130, 132 and operative to spray lubricating medium onto the gearing and mounting bearings housed in the right and left input modules 102, the right and left accessory modules 103, and the main transmission gearbox 104.

The lubricating medium in the sump 112 is pumped by the right and left pump stages 118B of the lubrication pumps 118 via the piping 122 to the cooler 124 where thermal energy is extracted from the lubricating medium. The cooled lubricating medium is then transported via the fluid piping 126 to the manifold 128 and the fluid piping 130, 132 to supply the fluid jets with lubricating medium for lubrication of the powertrain system as described in the preceding paragraph. The right and left scavenge stages 118A of the lubrication pumps 118 are operative to return the lubricating medium from the right and left input and accessory modules 102, 103 to the sump 112 via the fluid piping 120.

The lubricating medium in the main transmission gearbox housing 104 is returned to the sump 112 under the influence of gravity. Lubricating medium in the upper portion 104U drains into the lower portion 104L via the secondary oil drain passages 114, where it subsequently drains into the sump 112 via the primary oil drain passages 116. Lubricating medium sprayed into the lower portion 104L likewise drains into the sump 112 via the primary oil drain passages 116.

FIG. 1B is a schematic representation of a "dry sump" lubrication subsystem 111. The configuration of the "dry sump" lubrication subsystem 111 is generally similar to the "wet sump" lubrication subsystem 110 described in the preceding paragraphs, except as described hereinbelow. The sump 113 of the "dry sump" lubrication subsystem 111 is not disposed in combination with the lower portion 104L of the main transmission gearbox 104, but rather is typically mounted at a location remote from the main transmission gearbox 104 which allows design optimizing of the sump 113 in shape and size to make it less sensitive to attitude variations during helicopter flight operations. In the place of the lubrication pump 118 of the "wet sump" lubrication subsystem 118, the "dry sump" lubrication subsystem 111 includes two lubrication pumps 119, each lubrication pump 119 having scavenge stages 119A, 119B, and a pump stage 119C. The scavenge stages 119A are operative to provide motive power to transport lubricating medium from the left and right input and accessory modules 102, 103, respectively, back to the sump 113 via fluid piping 120. The scavenge stages 119B are operative to provide the motive power to transport lubricating medium collected in the bottom of the lower portion 104L of the main transmission gearbox 104 via an inlet 117 back to the sump 113 via fluid piping 121. The pump stages 119C of the "dry sump" lubrication subsystem 111 serve a similar function to the pump stages 118B of the "wet sump" lubrication subsystem 110.

The "wet sump" and "dry sump" lubrication subsystems 110, 111 described in the preceding paragraphs each have distinct advantages and disadvantages. One primary advantage of the "wet sump" lubrication subsystem 110 is that the configuration utilizes gravity draining to transport lubricating medium from the main transmission gearbox 104 to the sump 112, thereby eliminating the need liar the additional scavenge stages 119B and associated fluid piping 121 associated with the "dry sump" lubrication subsystem 111. This additional hardware imposes a significant weight penalty on the utilization of the "dry sump" lubrication subsystem 111. In addition, the additional hardware tends to decrease the overall reliability of the "dry sump" lubrication subsystem 111.

On the other hand, the location of the sump 112 of the "wet sump" lubrication subsystem 110 is relatively sensitive to attitude variations that may be encountered during helicopter flight operations, which may cause severe changes in the dynamic fluid level of the lubricating medium contained in the sump 112. At any given moment during operation of the lubrication subsystem 110, approximately 30–50% of the lubricating medium is contained in the sump 112, and the remaining 50–70% is located throughout the rest of the subsystem. The lubrication pumps 118 require a minimum fluid head of at least two to four inches for effective operation (fluid head being defined as the distance between the pump inlet and the dynamic fluid level of the sump 112). While the lubrication pumps 118 may be mounted below the sump 112 to ensure a sufficient fluid head, attitude variations during helicopter flight operations may cause aperiodic changes in the dynamic fluid level which cause the fluid head to fall below the minimum fluid head level, causing the lubrication pumps 118 to ingest an air-oil mixture, which results in inefficient pump operation, and as a result, inefficient subsystem operation. To compensate for attitude variations, the "wet sump" lubrication subsystem 110 may be over designed so that the subsystem contains an excess volume of lubricating medium, which desensitizes the subsystem to the adverse effects of attitude variations. However, this approach incurs a cost and weight penalty due to the excess volume of lubricating medium required as well as the increased volumetric capacity of the sump structure, i.e., increase in the vertical envelope of the sump.

The "wet sump" lubrication subsystem 110 is also disadvantageous inasmuch as the subsystem 110 configuration has a large structural envelope in the vertical dimension. The sump 112 and the lubrication pumps 118 of such a "wet sump" lubrication subsystem 110 configuration may intrude into the cabin area of the helicopter, which decreases the usable space therein.

A need exists to develop a lubrication subsystem that includes the positive characteristics of "wet" and "dry sump" lubrication subsystems. In particular, such a lubrication subsystem should have a sump location that minimizes the vertical structural envelope of the lubrication subsystem as in a "dry sump" lubrication subsystem. Such a lubrication subsystem would be relatively insensitive to attitude variations and would not adversely impact the space allocation of cabin area of the helicopter. Such a lubrication subsystem, however, should comprise the minimum number of scavenge and lubrication stages found in the "wet sump" lubrication subsystem, which results in minimal subsystem weight and increases the overall reliability of the subsystem.

SUMMARY OF THE INVENTION

One object of the present invention is to provide a self-scavenging, hybrid lubrication subsystem for a main transmission gearbox that is design optimized as an integral feature of the lower portion of the gearbox to provide a viscous pumping action to transport lubricating medium from the bottom of the gearbox to the subsystem sump.

Another object of the present invention is to provide a self scavenging, hybrid lubrication subsystem wherein the interior structure of the lower portion of the main transmission gearbox is structurally modified so that the structurally-modified housing, in interactive combination with the planetary gearing system housed therein, exerts a viscous pumping action on the lubricating medium collected in the bottom of the gearbox that imparts a rotational and centrifugal velocity to the lubricating medium to facilitate transport thereof from the bottom of the gearbox to the sump.

A further object of the present invention is to provide a self scavenging, hybrid lubrication subsystem wherein the sump is fabricated as an integral structural extension of the lower portion of the gearbox so that the lubricating medium in the sump is relatively insensitive to attitude variations and the dynamic fluid level of the lubricating medium in the sump is a predetermined distance above the bottom of the gearbox.

Yet another object of the present invention is to provide a self-scavenging, hybrid lubrication subsystem wherein the volume of lubricating medium in the sump is less than the volume of lubricating medium in a "wet sump" lubrication subsystem, thereby reducing the overall weight of the lubrication subsystem.

These and other objects of the present invention are achieved by a self-scavenging, hybrid lubrication subsystem for a main transmission gearbox that includes a lower portion having a planetary gearing system operationally housed therein, and wherein the lower portion of the main transmission gearbox is defined by a bottom wall and a side wall. The self scavenging, hybrid lubrication subsystem includes a sump fabricated as an integral structural extension of the lower portion of the main transmission gearbox. The sump contains a lubricating medium that defines a dynamic fluid level, and the sump is positioned so that the dynamic fluid level of the lubricating medium in the sump is a predetermined height above the inlet of the subsystem lubrication pump.

The side wall of the lower portion of the main transmission gearbox is structurally modified to include a cylindrical segment defined by a first predetermined radius, a transition segment contiguous with said cylindrical segment, and a throat segment defined by a second predetermined radius. The first predetermined radius is greater than the second predetermined radius such that a radial discontinuity is defined between the cylindrical segment and the throat segment. A nozzle inlet is defined by the radial discontinuity between the cylindrical segment and the throat segment, and the inner and outer walls defining the nozzle inlet are tangent to the throat and cylindrical segments, respectively. The self-scavenging, hybrid lubrication subsystem further comprises a nozzle having an intake end and an outflow end. The intake end of the nozzle is defined by the nozzle inlet and the outflow end of the nozzle is positioned in the sump so that said outflow end is above the dynamic fluid level of the sump.

The planetary gear train housed in the lower portion of the gearbox includes an annular planetary carrier plate having a peripheral surface defined by a predetermined radius. Operation of the planetary gear train causes rotation of the annular planetary carrier plate. The peripheral surface of the annular planetary carrier plate and the cylindrical and throat segments of the structurally-modified side wall in combination form primary and restricted flow channels that are defined by first and second gaps having first and second radial dimensions, respectively. A deflection plate is mounted in combination with the annular planetary carrier plate to define a third gap having a vertical dimension between the deflection plate and the bottom of the gearbox.

The interaction between the rotating deflection plate and the bottom wall of the main transmission gearbox exerts a viscous pumping action on lubricating medium collected in the bottom of the gearbox. The viscous pumping action imparts a rotational and centrifugal velocity to the lubricating medium that causes the lubricating medium to flow outwardly into the primary and restrictive flow channels. The interaction between the peripheral surface of the rotating annular planetary carrier plate and the structurally-modified side wall exerts a viscous pumping action on lubricating medium in the primary and restricted flow channels to cause the lubricating medium to flow therethrough. Substantially all of the lubricating medium flowing in the primary flow channel is diverted through the nozzle inlet and transported through the nozzle to the sump.

Operation of the planetary gearing system may generate metallic debris in the main transmission gearbox. The first radial dimension defining the first gap and the vertical dimension defining the third gap are sized to accommodate migration of such metallic debris in the third gap and the primary flow channel, respectively, so that such metallic debris is ultimately transported from the gearbox to the sump by means of the outflow of the lubricating medium from the gearbox to the sump. For the embodiment of the self-scavenging, hybrid lubrication subsystem described herein, the first radial dimension and the vertical dimension defining the first and third gaps is about 0.97 cm (about 0.38 inches).

The second radial dimension defining the second gap is sized to constrain the flow of lubricating medium through the restrictive flow channel so that substantially all of the lubricating medium flowing in the primary flow channel is diverted through the nozzle inlet. For the embodiment of the self-scavenging, hybrid lubrication subsystem described herein, the second radial dimension defining the second gap is about 0.08 cm (about 0.03 inches).

BRIEF DESCRIPTION OF THE DRAWINGS

A more complete understanding of the present invention and the attendant features and advantages thereof may be had by reference to the following detailed description when considered in conjunction with the following drawings wherein.

BEST MODE FOR CARRYING OUT THE INVENTION

Figure 1A:
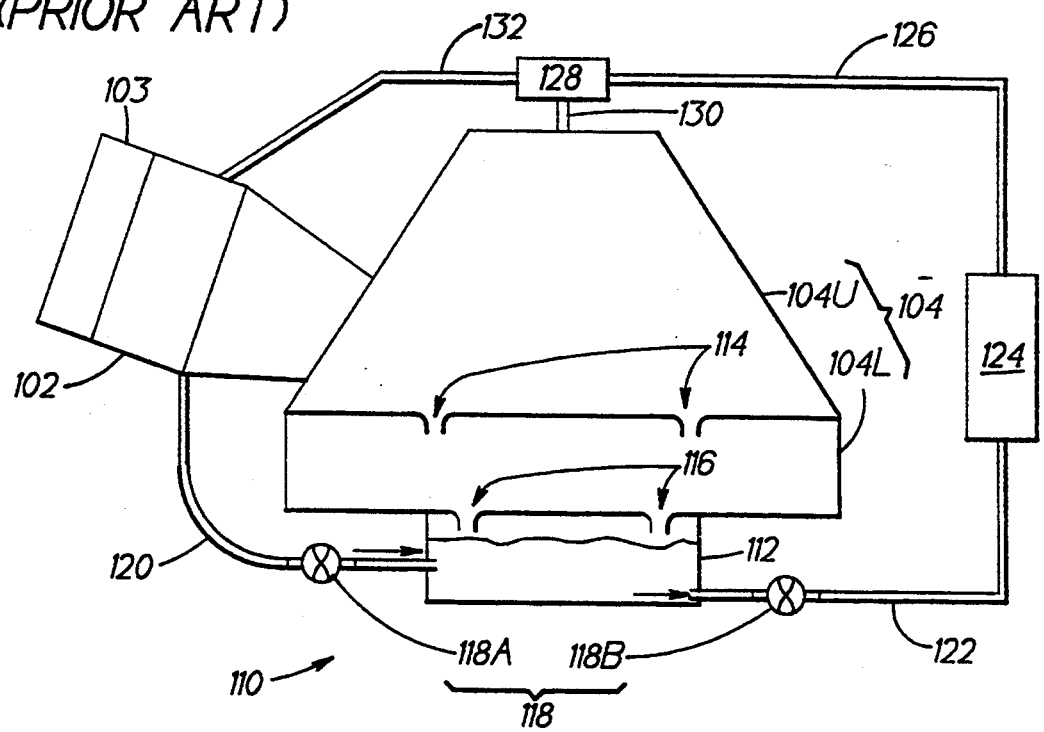
FIG. 1A is a schematic representation of a prior art "wet sump" lubrication subsystem.
Figure 1B:
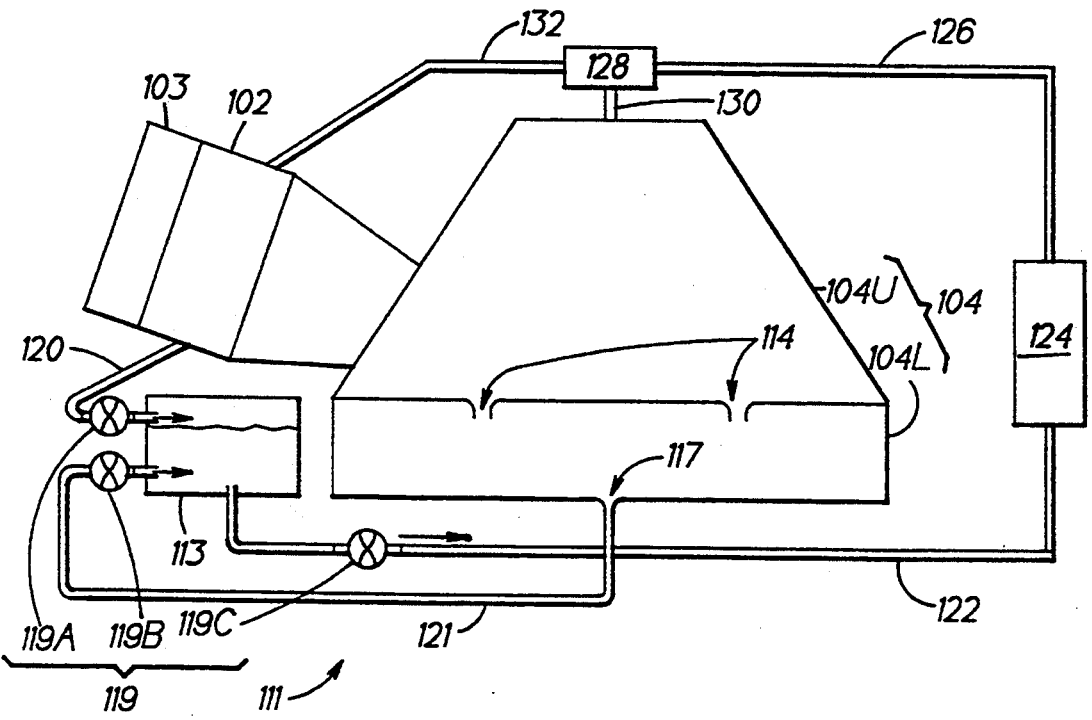
FIG. 1B is a schematic representation of a prior art "dry sump" lubrication subsystem.
Figure 2:
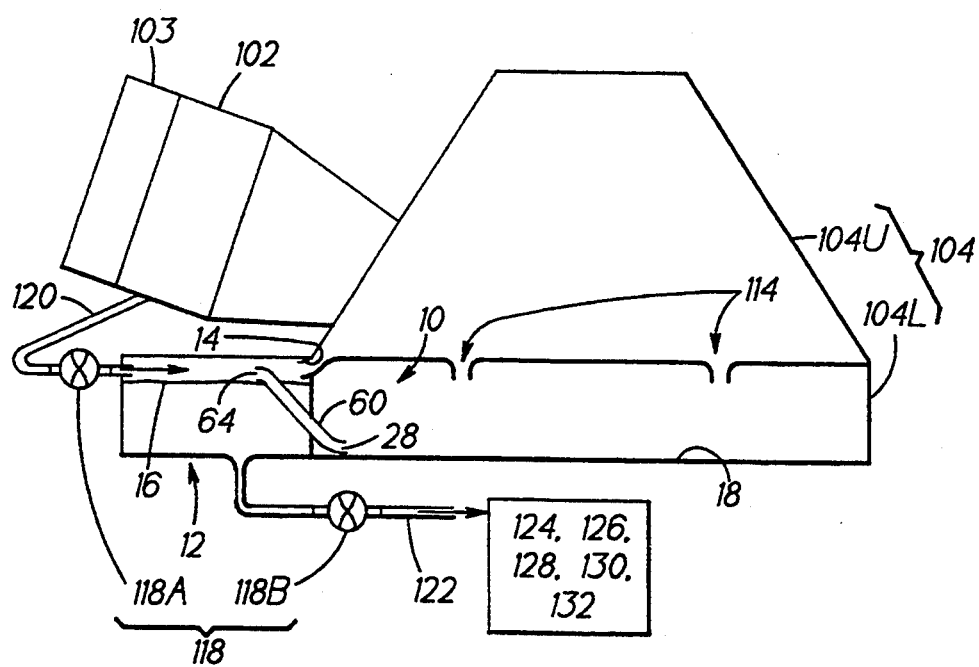
FIG. 2 is a schematic representation of a self-scavenging, hybrid lubrication subsystem according to the present invention.

Referring now to the drawings wherein like reference characters identify corresponding or similar elements throughout the several views, FIG. 2 is a schematic representation of an embodiment of a self-scavenging, hybrid lubrication (SSHL) subsystem 10 according to the present invention. The embodiment of the SSHL subsystem 10 described herein is operatively associated with the lower portion 104L of the main transmission gearbox 104 of a helicopter and includes characteristics of the "wet sump" and "dry sump" lubrication subsystems described hereinabove. More specifically, the SSHL subsystem 10 includes a sump 12, which is described in further detail hereinbelow, that is positioned so that the dynamic fluid level of the lubricating medium in the sump 12 is above the lubricating medium collected in the bottom of the lower portion 104L of the main transmission gearbox 104 (as in a "dry sump" lubrication subsystem). Such positioning of the sump 12 minimizes the effects of attitude variations on the dynamic fluid level in the sump 12, i.e., similar to the "dry sump" lubrication subsystem 111. Lubricating medium in the main transmission gearbox 104 collects in the bottom of the lower portion 104L thereof from the fluid jets and by gravity draining through channels and drain ports (see, e.g., reference numeral 114 in FIGS. 2, 3) formed in the main transmission gearbox 104 (as in "wet sump" and "dry sump" lubrication subsystems). However, as described hereinbelow in further detail, the SSHL subsystem 10 does not include a separate scavenge pump to transport the lubricating medium collected in the bottom of the lower portion 104L of the main transmission gearbox 104 to the sump 12. Instead, the internal housing of the lower portion 104L of the main transmission gearbox 104 is structurally modified so that the modified gearbox housing and the third stage reduction gearing housed therein provide, in interactive combination, a viscous pumping force that transports the lubricating medium collected in the bottom of lower portion 104L of the main transmission gearbox 104 to the sump 12, thereby eliminating the need for the additional scavenge stage 119B incorporated in the "dry sump" lubrication subsystem 111, i.e., the SSHL subsystem 10 according to the present invention incorporates the minimum number of lubrication pumps found in the "wet sump" lubrication subsystem 111.

With further reference to FIG. 2, the SSHL subsystem 10 further includes separate scavenge stages 118A for each input and accessory module 102, 103 (as in both the "wet sump" and "dry sump" lubrication subsystems) to transport lubricating medium therefrom to the sump 12, and the corresponding pump stages 118B to recirculate lubricating medium from the sump 12 to the right and left input modules 102, the right and left accessory modules 103, and the main transmission gearbox 104. The other functional components/elements comprising the SSHL subsystem 10 are illustrated generally in FIG. 2 in a block diagram inasmuch as the structural and functional characteristics of such components/elements are equivalent to the corresponding components/elements of the "wet sump" and "dry sump" lubrication subsystems 110, 111 described hereinabove.

Figure 3:
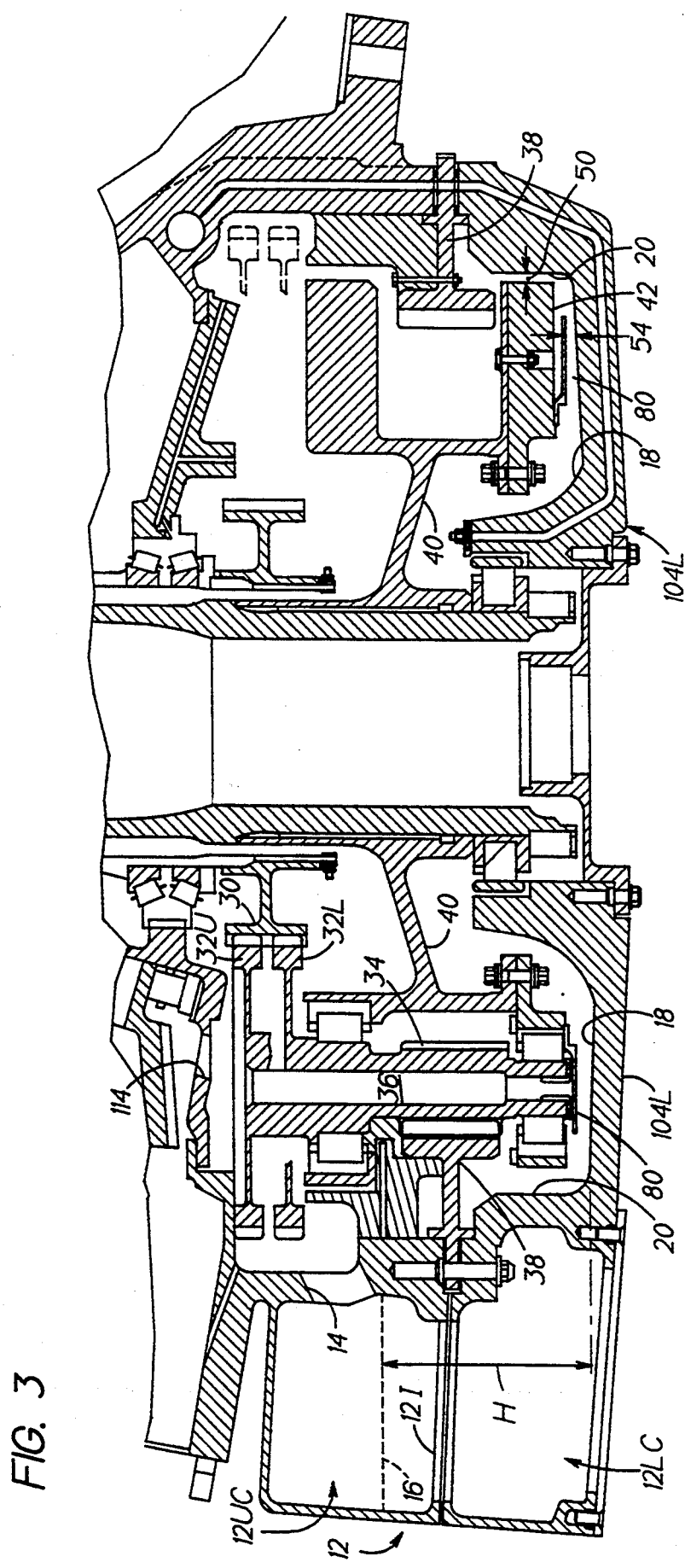
FIG. 3 is a cross-sectional view of the lower portion of the main transmission gearbox of a helicopter illustrating elements of the self-scavenging, hybrid lubrication subsystem according to the present invention.

The embodiment of the SSHL subsystem 10 described herein is design optimized as an integral feature of the lower portion 104L of the main transmission gearbox 104 of the S-92 TM HELIBUS TM helicopter (S-92 and HELIBUS are trademarks of the Sikorsky Aircraft Division of United Technologies Corporation) being developed by Sikorsky Aircraft. In particular, the sump 12 of the SSHL subsystem 10, which is exemplarily illustrated in FIGS. 3-5 and 7, is fabricated as an integral structural extension of the lower cylindrical portion 104 of the S-92 TM HELIBUS TM main transmission gearbox 104 and comprises an upper chamber $12_{UC}$ and a lower chamber $12_{LC}$ defined by an intermediate wall 12I, as particularly illustrated in FIG. 3 (see also FIG. 7). A drain port 14 is exemplarily illustrated in FIG. 3, the drain port 14 facilitating gravity draining of the lubricating medium from the upper portion 104U of the main transmission gearbox 104 into the sump 12. With the main transmission gearbox 104 installed in the helicopter, the sump 12 is located between the front portion of the rectangular opening of the helicopter airframe into which the main transmission gearbox 104 is installed and the lower cylindrical portion 104L of the main transmission gearbox 104 (see FIG. 5). The dynamic fluid level of the sump 12, which is exemplarily illustrated by reference numeral 16 in FIG. 3, is several inches above the bottom wall of the lower portion 104L of the main transmission gearbox 104. For the described embodiment, the dynamic fluid level is approximately five inches above the bottom wall (see reference character H in FIG. 3).

Figure 4:
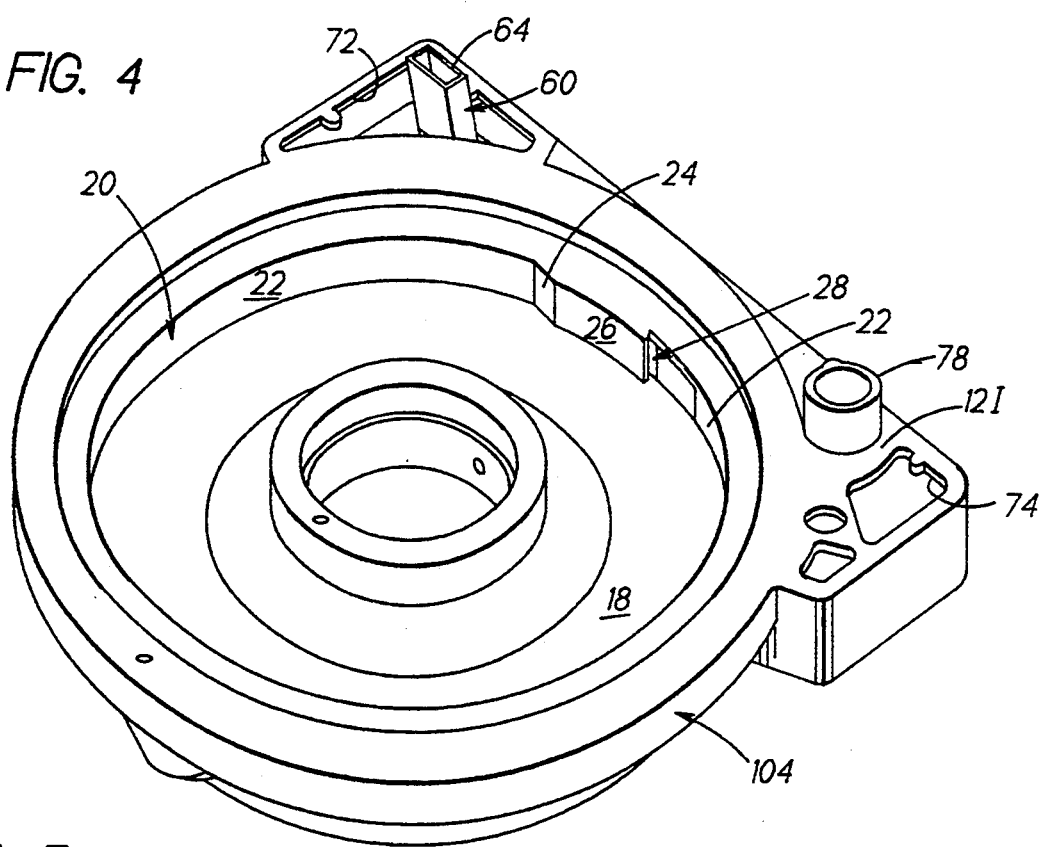
FIG. 4 is a perspective view of the lower portion of the main transmission gearbox of FIG. 3.
Figure 5:
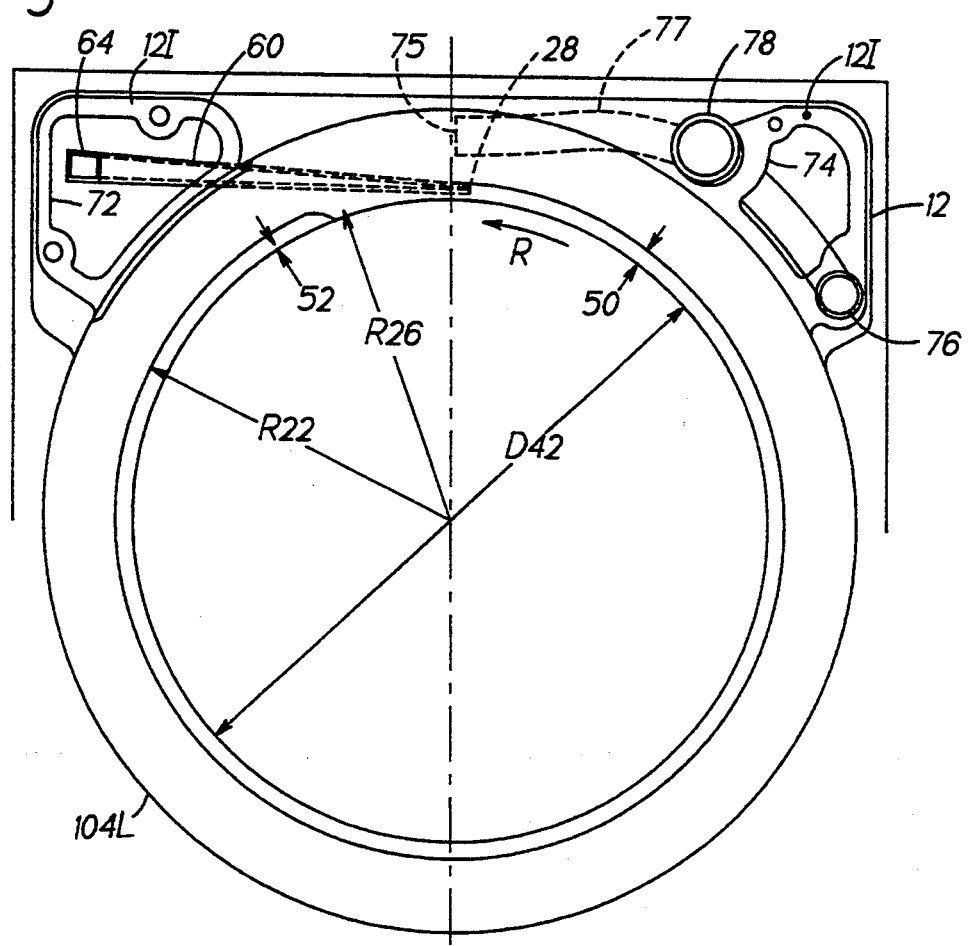
FIG. 5 is a top plan view of the lower portion of the main transmission gearbox of FIG. 4.

The interior structure of the lower portion 104L of the S-92 TM HELIBUS TM main transmission gearbox 104 is defined by a bottom wall 18 and a structurally-modified side wall 20 as illustrated in FIGS. 3-5. The side wall 20 is structurally modified so that the side wall 20, in interactive combination with the third stage reduction gearing housed therein, operates as a self-scavenging sump pump to transport the lubricating medium collected in the bottom 18 of the lower portion 104L of the main transmission gearbox 104 to the sump 12. With reference to FIGS. 4-5, the structurally-modified side wall 20 is fabricated, e.g., machined, cast, to include a cylindrical segment 22 defined by a predetermined radius $R_{22}$ that forms substantially the entire circumference of the side wall 20, i.e., the side wall 20 is generally cylindrical in configuration, a transition segment 24 contiguous with one end of the cylindrical segment 22, and a throat segment 26 defined by a predetermined radius $R_{26}$ that is contiguous with the transition segment 24. An examination of FIGS. 4-5 shows that the predetermined radius $R_{22}$ is greater than the predetermined radius $R_{26}$, i.e., $R_{22} > R_{26}$. The radial discontinuity between the end of the throat segment 26 and the other end of the cylindrical segment 22 of the modified side wall 20 in combination define a nozzle inlet 28 of generally rectangular cross section, i.e., the inner and outer walls defining the nozzle inlet 28 are tangent to the throat and cylindrical segments 26, 22, respectively. The nozzle inlet 28 is operative to direct the outflow of the collected lubricating medium from the bottom 18 of the S-92 TM HELIBUS TM main transmission gearbox 104 into the sump 12.

Figure 7:
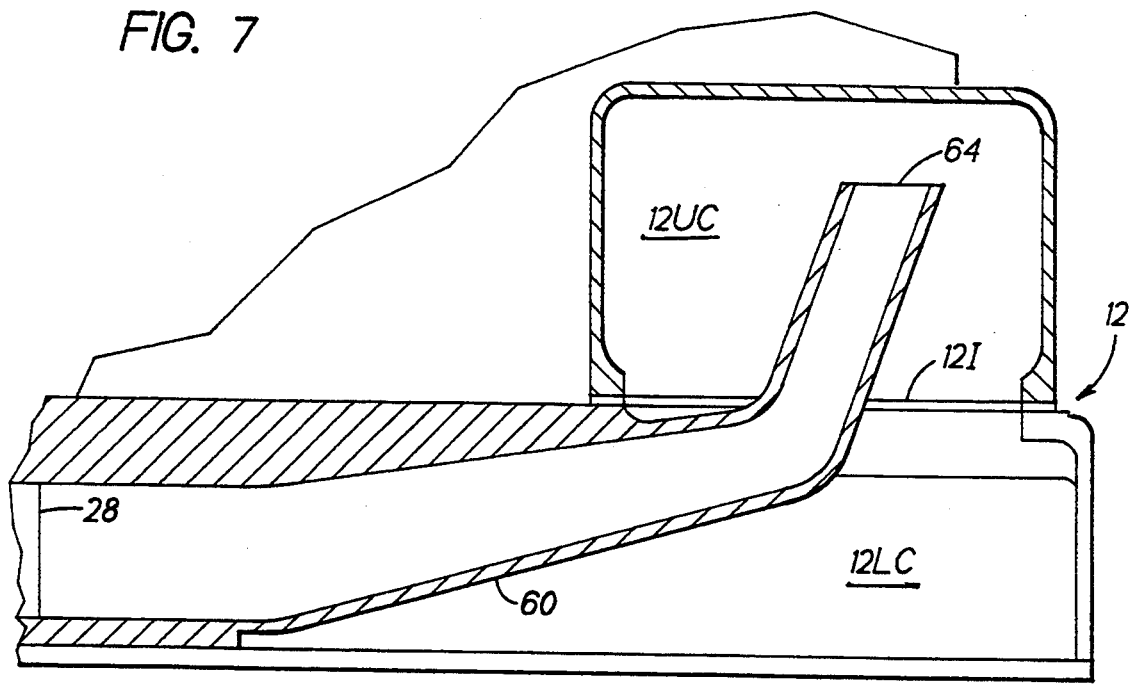
FIG. 7 is a cross-sectional view of the sump through the nozzle of the self-scavenging, hybrid lubrication subsystem according to the present invention.

With reference to FIGS. 5, 7, the SSHL subsystem 10 further includes a nozzle 60 that has an intake end that is defined by the nozzle inlet 28 described in the preceding paragraph and an outflow end 64 (see also FIG. 2). The nozzle 60 is operative to channel the lubricating medium flowing out through the nozzle inlet 28 into the sump 12. The outflow end 64 of the nozzle 60 is positioned in the upper chamber $12_{UC}$ above the intermediate wall 12I separating the upper and lower chambers $12_{UC}$, $12_{LC}$ of the sump 12, i.e., the outflow end 64 is located above the dynamic fluid level 16 of the sump 12. Such positioning of the outflow end 64 of the nozzle 60 precludes any back pressure from lubricating medium draining from the upper portion 104U of the main transmission gearbox 104 into the sump 12 from interfering with the lubricating medium being transported into the sump 12 by viscous pumping.

Also illustrated in FIG. 5 are two sump openings 72, 74 formed in the intermediate wall 12I of the sump 12. The outflow end 64 of the nozzle 60 protrudes through the indicated sump opening 72. Also shown in FIG. 5 is an outlet 76 for fluidically interconnecting the pump stages 118B of the two lubricating pumps 118 to the sump 12 and to the upper housing 104U. A chip detection unit 78 is mounted in combination with the sump 12 and operative to provide indications of metallic debris in the sump 12. A pump inlet 75 is located at the bottom of the sump 12 at the centerline of the helicopter (Butt Line 0). This location minimizes fluctuations in the dynamic fluid level 16 above the inlet 75 as a result of helicopter roll maneuvers. The dynamic fluid level 16 is more precisely described as being the dimension H above the pump inlet 75, but for this purpose the pump inlet 75 and the bottom wall 18 of the main transmission gearbox 104 are pragmatically equivalent. The pump inlet 75 is fluidically interconnected to the chip detector 78 and the pump outlet 76 by means of a flow pipe 77.

Figure 6:
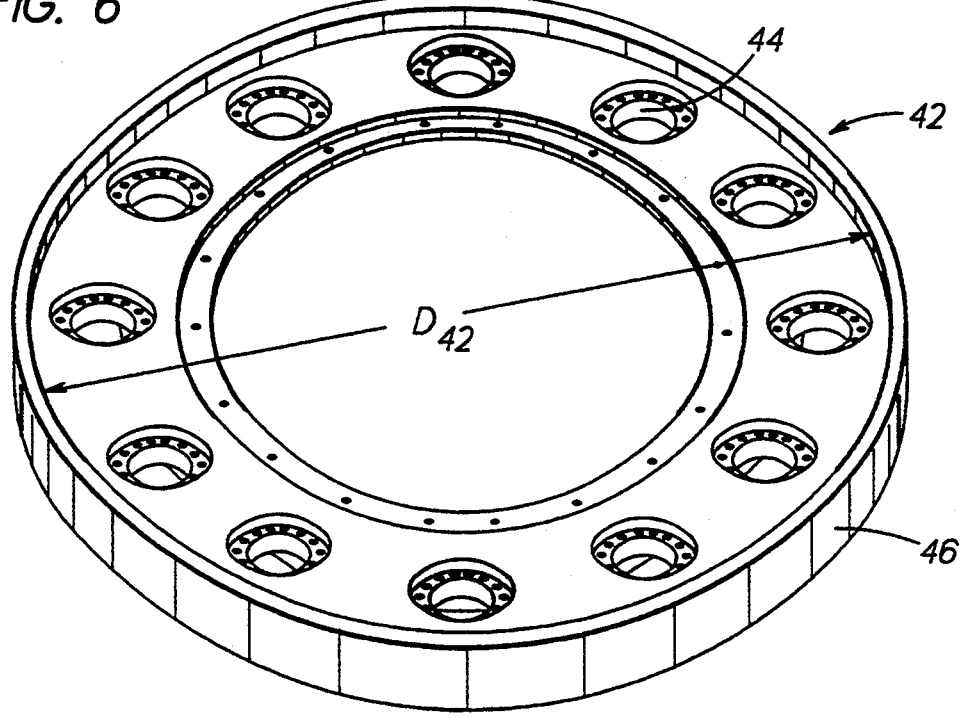
FIG. 6 is a perspective view of an annular planetary carrier plate of a planetary carrier assembly.

Housed within the lower portion 104L of the main transmission gearbox 104 is the third stage reduction gearing of the helicopter powertrain system. The third stage reduction gearing for the S-92 TM HELIBUS TM main transmission gearbox 104 comprises a stacked compound planetary gear train that includes a driving sun gear 30, a plurality of stacked primary planetary pinions 32U, 32L, a plurality of secondary planetary pinions 34, compound drive shafts 36, a fixed ring gear 38, and a planetary carrier assembly 40, as claimed and described in further detail in commonly-owned, co-pending U.S. patent application entitled A STACKED COMPOUND PLANETARY GEAR TRAIN FOR AN UPGRADED POWERTRAIN SYSTEM FOR A HELICOPTER (S-4888) filed 26 May 1994. Of particular interest for the SSHL subsystem 10 according to the present invention is the annular planetary carrier plate 42 that comprises an element of the planetary carrier assembly 40, as illustrated generally in FIG. 3 and in further detail in FIG. 6. The carrier plate 42 has a predetermined outer diameter $D_{42}$ and includes a plurality of sockets 44 for rotatably supporting the compound drive shafts 36 and a peripheral surface 46. The peripheral surface 46 and the structurally-modified side wall 20 in combination define flow channels in the lower portion 104L of the main transmission gearbox 104 as described in the following paragraphs. The peripheral surface 46 functionally interacts with the structurally-modified side wall 20 of the main transmission gearbox 104 to provide viscous pumping action for the SSHL subsystem 10 according to the present invention that transports the lubricating medium collected in the bottom 18 of the lower portion 104L of the main transmission gearbox 104 into the sump 12.

The peripheral surface 46 of the annular planetary carrier plate 42 and the cylindrical segment 22 of the structurally-modified side wall 20 in combination form a primary flow channel defined by a first gap 50 having a first predetermined width dimension, i.e., in the radial direction (see FIG. 3). The diameter $D_{42}$ of the carrier plate 42 is generally defined by the structural and functional requirements of the stacked compound planetary gear train. Therefore, the side wall 20 of the lower portion is structurally modified so that the radius $R_{22}$ of the cylindrical segment 22 is such that $R_{22}-D_{42}/2$ defines the first predetermined width dimension of the first gap 50. For the described embodiment, the first predetermined width dimension of the first gap 50 is about 0.97 cm (about 0.38 inches).

The predetermined width dimension of the first gap 50 is based upon a design objective that metallic debris that is generated due to the functional operation of the third stage reduction gearing housed in the main transmission gearbox 104, e.g., by bearing spalling, gear tooth spalling, etc., be removed by means of the lubricating medium that is transported from the main transmission gearbox 104 to the sump 12. Accordingly, the first gap 50 must be sized to accommodate the movement of such metallic debris in the primary flow channel. A second design objective that defines the width dimension of the first gap 50 is the requirement that the viscous pumping action provided by the interaction between the structurally-modified side wall 20 and the annular planetary carrier plate 42 impart a velocity to the lubricating medium sufficient to transport metallic debris from the bottom 18 of the main transmission gearbox 104 to the sump 12. For the described embodiment, the rotational velocity of the peripheral surface 46 of the annular planetary carrier plate 42 is approximately 7.7 m/s (approximately 25 ft/s). Empirical analyses showed that a first gap 50 having a radial dimension of about 0.97 cm (about 0.38 inches) was sufficient to facilitate the migration of the largest-sized metallic debris generated by operation of the third stage reduction gearing.

The peripheral surface 46 of the annular planetary carrier plate 42 and the throat segment 26 of the structurally-modified side wall 20 in combination form a restricted flow channel defined by a second gap 52 having a second predetermined width dimension, i.e., in the radial direction (see FIG. 5). That is, $R_{26}-D_{42}/2$ defines the second predetermined width dimension of the second gap 52. For the described embodiment, the second predetermined width dimension of the second gap 52 is about 0.08 cm (about 0.03 inches). The sizing of the restricted flow channel, i.e., sizing of the second gap 52, is based upon the design requirement that substantially all of the lubricating medium subjected to viscous pumping ultimately be transported out of the main transmission gearbox 104 by means of outflow through the nozzle inlet 28 and the nozzle 60, i.e., there is minimal fluid flow through the restricted flow channel defined by the second gap 52. Essentially, this is achieved by ensuring that the ratio of the flow channel defined by the nozzle inlet 28, i.e., $R_{22}-D_{42}/2$, is significantly greater than the restricted flow channel defined by the second gap 52. For the described embodiment, the ratio is approximately $0.89/0.08 \approx 11+$.

A deflection plate 80 is mounted in combination with the annular planetary carrier plate 42, as illustrated in FIG. 3, so that the plate 80 defines a predetermined third gap 54 having a predetermined vertical dimension with respect to the bottom wall 18 of the main transmission gearbox 104. The predetermined vertical dimension of the third gap 54 is based upon the same design objectives as discussed hereinabove for the first gap 50. The deflection plate 80 is operative, due to the centrifugal force generated by rotation of the carrier plate 42, to direct metallic debris and lubricating medium outwardly therefrom into the primary flow channel. The outward flow includes metallic debris and lubricating medium that passes through the planetary gearing train, i.e., proximal the top surface of the deflection plate 80, as well as metallic debris and lubricating medium collected between the deflection plate 80 and the bottom wall 18 of the main transmission gearbox 104. The bottom surface of the deflection plate 80 may be grooved to facilitate the flow of lubricating medium outwardly from beneath the carrier plate 42.

In addition to the centrifugal force exerted by the rotating deflection plate 80 on metallic debris and lubricating medium from the planetary gearing train, the interaction between (i) the bottom surface of the rotating deflection plate 80 and the bottom wall 18 of the main transmission gearbox 104 and (ii) the peripheral surface 46 of the rotating annular planetary carrier plate 42 and the structurally-modified side wall 20 provides a viscous pumping action that (i) transports collected lubricating medium from the bottom 18 of the main transmission gearbox 104 outwardly to the primary flow channel defined by the first gap 50 and (ii) from the primary flow channel out through the nozzle inlet 28 (a pragmatic analysis has shown that about 65% of the lubricating medium flow is a result of the interaction between the rotating deflection plate 80 and the bottom wall 18 of the main transmission gearbox 104). A viscous pumping action is exerted on a fluid disposed between a stationary member, i.e., the bottom wall 18 and the structurally-modified side wall 20, and a moving member, i.e., the deflection plate 80 and the carrier plate 42, respectively. The fluid adjacent to the stationary member will be essentially stationary while the fluid adjacent the moving member will have a velocity approaching the velocity of the moving member, i.e., the velocity of the moving member is imparted to the adjacent fluid due to the viscous drag of the fluid. Reference character R in FIGS. 4-5 shows the direction of rotation of the deflection plate 80 and the annular planetary carrier plate 42. The viscous pumping action engendered by rotation of the deflection and carrier plates 42, 80 imparts both a rotational velocity and a centrifugal velocity to the lubricating medium which causes the lubricating medium collected in the bottom of the main transmission gearbox 104 to flow outwardly into and through the primary flow channel defined by the structurally-modified side wall 20 and the carrier plate 42.

The second consideration is Bernoulli's law which states that there is a conservation of momentum in fluid flow. The viscous pumping action will create a predetermined volume flow of lubricating medium through the primary flow channel defined by the first gap 50. In accordance with Bernoulli's law, the predetermined volume flow will be substantially constant in the region of the nozzle inlet 28. Since restricted flow channel defined by the second gap 52 and nozzle flow channel defined by the nozzle inlet 28 define the cumulative flow channel at the inception of the throat segment 26, substantially all of the predetermined volume flow generated by the viscous pumping action will be diverted through the nozzle inlet 28. That is, the viscous pumping by the rotational interaction between (i) the bottom wall 18 and the deflection plate 80 and (ii) the structurally-modified side wall 20 and the peripheral surface 46 of the annular planetary carrier plate 42 will cause lubricating medium to be transported out of the main transmission gearbox 104 via the nozzle inlet 28 and the nozzle 60. Viscous pump theory shows that the viscous pumping action generated by the SSHL subsystem 10 according to the present invention is sufficient to transport approximately ten gallons per minute (gpm) of lubricating medium from the lower portion 104L of the main transmission gearbox 104 to the sump 12. The lubrication pumps 118 of the SSHL subsystem 10 are sized to deliver about 14.4 gpm to the main transmission gearbox 104. Of this 14.4 gpm, about 6.6 gpm is fed to or gravity drains into the bottom 18 of the main transmission gearbox 104. Based upon the foregoing factors, it is evident that viscous pumping action provided by the SSHL subsystem 10 according to the present invention is sufficient to handle the transport of the lubricating medium from the bottom 18 of the main transmission gearbox 104 into the sump 12.

While the SSHL subsystem 10 according to the present invention is described herein in terms of the specific structural and functional features of the S-92 ™ HELIBUS ™ main transmission gearbox, one skilled in the art will appreciate that description of the SSHL subsystem presented herein is not intended to be limited to the application of the described embodiment, but rather, may be used in any gearing system that is capable of being modified to operate as described hereinabove. It is therefore to be understood that, within the scope of the claims appended hereto, the SSHL subsystem of the present invention may be practiced other than as specifically described herein.

What is claimed is:

1. A self-scavenging, hybrid lubrication subsystem for a main transmission gearbox that includes a lower portion having a planetary gearing system operationally housed therein, the lower portion of the main transmission gearbox being defined by a bottom wall and a side wall, said self-scavenging, hybrid lubrication subsystem comprising:

a sump containing lubricating medium that defines a dynamic fluid level, said sump being fabricated as an integral structural extension of the lower portion of the main transmission gearbox so that the dynamic fluid level of the lubricating medium in said sump is a predetermined height above the bottom wall of the main transmission gearbox;

the side wall of the lower portion of the main transmission gearbox being structurally modified to include a cylindrical segment defined by a first predetermined radius, a transition segment contiguous with said cylindrical segment, a throat segment defined by a second predetermined radius, said first predetermined radius being greater than said second predetermined radius wherein a radial discontinuity is defined therebetween, and a nozzle inlet defined by the radial discontinuity between said cylindrical segment and said throat segment, the inner and outer walls defining said nozzle inlet being tangent to said throat and cylindrical segments, respectively;

a nozzle having an intake end and an outflow end, said intake end being defined by said nozzle inlet and said outflow end being positioned in said sump so that said outflow end is above the dynamic fluid level of said sump;

the planetary gear train including an annular planetary carrier plate having a peripheral surface defined by a predetermined radius, said annular planetary carrier plate being subjected to rotational motion during operation of the planetary gear train;

said peripheral surface of said annular planetary carrier plate and said cylindrical and throat segments of said structurally-modified side wall in combination forming primary and restricted flow channels defined by first and second gaps having first and second radial dimensions, respectively; and a deflection plate mounted in combination with said annular planetary carrier plate to define a third gap having a vertical dimension between said deflection plate and the bottom wall of the main transmission gearbox;

interaction between said deflection plate and the bottom wall of the main transmission gearbox exerting a viscous pumping action on lubricating medium collected in the bottom of the main transmission gearbox that imparts a rotational and centrifugal velocity to the lubricating medium that causes the lubricating medium to flow outwardly into said primary and restrictive flow channels;

interaction between said peripheral surface of said rotating annular planetary carrier plate and said structurally-modified side wall exerting a viscous pumping action on the lubricating medium in said primary and restrictive flow channels to cause the lubricating medium to flow therethrough; and wherein substantially all of the lubricating medium flowing in said primary flow channel is diverted through said nozzle inlet and transported through said nozzle to said sump.

2. The self-scavenging, hybrid lubrication subsystem of claim 1 further comprising means liar recirculating lubricating medium in said sump to the main transmission gearbox.

3. The self-scavenging, hybrid lubrication subsystem of claim 1 wherein said first radial dimension defining said first gap is sized to accommodate migration of metallic debris in said primary flow channel.

4. The self-scavenging, hybrid lubrication subsystem of claim 3 wherein said first radial dimension defining said first gap is about 0.97 cm (about 0.38 inches).

5. The self scavenging, hybrid lubrication subsystem of claim 1 wherein said second radial dimension defining said second gap is sized to constrain flow in said restrictive flow channel such that substantially all of the lubricating medium flowing in said primary flow channel is diverted to flow through said nozzle inlet.

6. The self-scavenging, hybrid lubrication subsystem of claim 5 wherein said second radial dimension defining said second gap is about 0.08 cm (about 0.03 inches).

7. The self-scavenging, hybrid lubrication subsystem of claim 1 wherein said vertical dimension defining said third gap between said deflection plate and the bottom wall of the main transmission gearbox is sized to accommodate migration of metallic debris through said third gap.

8. The self-scavenging, hybrid lubrication subsystem of claim 7 wherein said vertical dimension defining said third gap is about 0.97 cm (about 0.38 inches).

9. The self-scavenging, hybrid lubrication subsystem of claim 1 wherein the planetary gear train is a stacked compound planetary gear train that includes:
 a driving sun gear;
 a plurality N of stacked primary planetary pinions functionally interacting with said driving sun gear, said plurality N of stacked primary planetary pinions including a first plurality N/2 of upper primary planetary pinions, and a second plurality N/2 of lower primary planetary pinions, and wherein said upper and lower primary planetary pinions are disposed in a staggered, biplanar relationship;
 a plurality N of secondary planetary pinions;
 a compound drive shaft supporting a respective primary planetary pinion and a secondary planetary pinion;
 a fixed ring gear interacting with said plurality of secondary planetary pinions, and
 a planetary carrier assembly disposed in rotatable combination with said compound drive shafts, said planetary carrier assembly including said annular planetary carrier plate.

10. A self-scavenging, hybrid lubrication subsystem for a helicopter main transmission gearbox that includes an upper portion and a lower portion having a planetary gearing system operationally housed therein, the lower portion of the main transmission gearbox being defined by a bottom wall and a side wall, said self-scavenging, hybrid lubrication subsystem comprising:
 a sump containing lubricating medium that defines a dynamic fluid level, said sump being fabricated as an integral structural extension of the lower portion of the main transmission gearbox so that the dynamic fluid level of the lubricating medium in said sump is a predetermined height above the bottom wall of the main transmission gearbox;
 the side wall of the lower portion of the main transmission gearbox being structurally modified to include
 a cylindrical segment defined by a first predetermined radius,
 a transition segment contiguous with said cylindrical segment,
 a throat segment defined by a second predetermined radius,
 said first predetermined radius being greater than said second predetermined radius wherein a radial discontinuity is defined therebetween, and
 a nozzle inlet defined by the radial discontinuity between said cylindrical segment and said throat segment;
 a nozzle having an intake end and an outflow end, said intake end being defined by said nozzle inlet and said outflow end being positioned in said sump so that said outflow end is above the dynamic fluid level of said sump;
 wherein the planetary gear train is a stacked compound planetary gear train that includes
 a driving sun gear,
 a plurality N of stacked primary planetary pinions functionally interacting with said driving sun gear, said plurality N of stacked primary planetary pinions including a first plurality N/2 of upper primary planetary pinions, and a second plurality N/2 of lower primary planetary pinions, and wherein said upper and lower primary planetary pinions are disposed in a staggered, biplanar relationship,
 a plurality N of secondary planetary pinions,
 a compound drive shaft supporting a respective primary planetary pinion and a secondary planetary pinion,
 a fixed ring gear interacting with said plurality of secondary planetary pinions, and
 a planetary carrier assembly disposed in rotatable combination with said compound drive shafts, said planetary carrier assembly including an annular planetary carrier plate having a peripheral surface defined by a predetermined radius, and wherein said annular planetary carrier plate is subjected to rotational motion during operation of said stacked compound planetary gear train;
 said peripheral surface of said annular planetary carrier plate and said cylindrical and throat segments of said structurally-modified side wall in combination forming primary and restricted flow channels defined by first and second gaps having first and second radial dimensions, respectively;
 a deflection plate mounted in combination with said annular planetary carrier plate to define a third gap having a vertical dimension between said deflection plate and the bottom wall of the main transmission gearbox;
 interaction between said rotating deflection plate and the bottom wall of the main transmission gearbox exerting a viscous pumping action on lubricating medium collected in the bottom of the main transmission gearbox that imparts a rotational and centrifugal velocity to the lubricating medium that causes the lubricating medium to flow outwardly into said primary and restrictive flow channels;
 interaction between said peripheral surface of said rotating annular planetary carrier plate and said structurally-modified side wall exerting a viscous pumping action on the lubricating medium in said primary and restrictive flow channels to cause the lubricating medium to flow therethrough; and wherein
 substantially all of the lubricating medium flow through said primary flow channel is diverted through said nozzle inlet and transported through said nozzle to said sump; and
 means for recirculating lubricating medium in said sump to the main transmission gearbox.

11. The self-scavenging, hybrid lubrication subsystem of claim 10 wherein said first radial dimension defining said first gap is sized to accommodate migration of metallic debris in said primary flow channel.

12. The self scavenging, hybrid lubrication subsystem of claim 11 wherein said first radial dimension defining said first gap is about 0.97 cm (about 0.38 inches).

13. The self-scavenging, hybrid lubrication subsystem of claim 10 wherein said second radial dimension defining said second gap is sized to constrain flow in said restrictive flow channel such that substantially all of the lubricating medium flowing in said primary flow channel is diverted to flow through said nozzle inlet.

14. The self-scavenging, hybrid lubrication subsystem of claim 13 wherein said second radial dimension defining said second gap is about 0.08 cm (about 0.03 inches).

15. The self-scavenging, hybrid lubrication subsystem of claim 10 wherein said vertical dimension defining said third gap between said deflection plate and the bottom wall of the main transmission gearbox is sized to accommodate migration of metallic debris through said third gap.

16. The self-scavenging, hybrid lubrication subsystem of claim 15 wherein said vertical dimension defining said third gap is about 0.97 cm (about 0.38 inches).

* * * * *